2,039,526

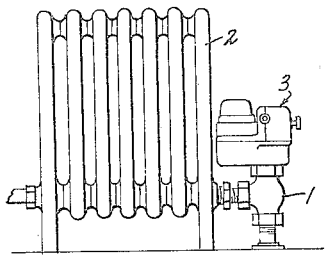
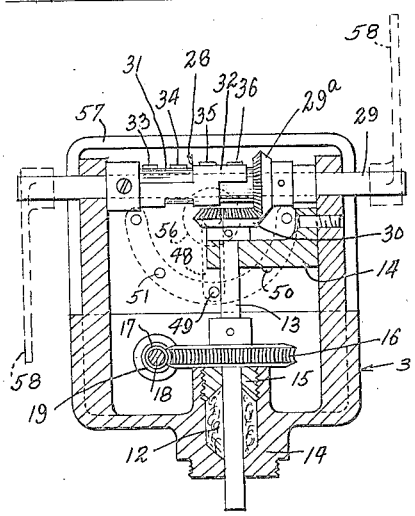
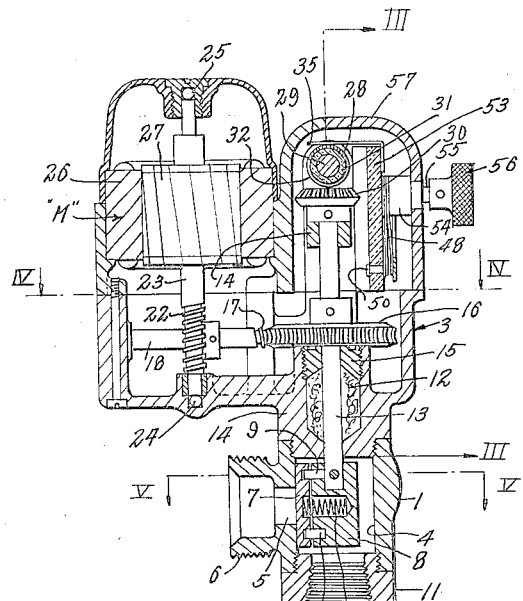
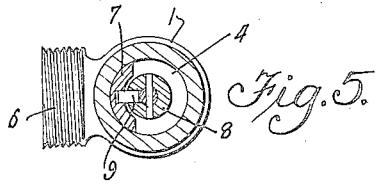
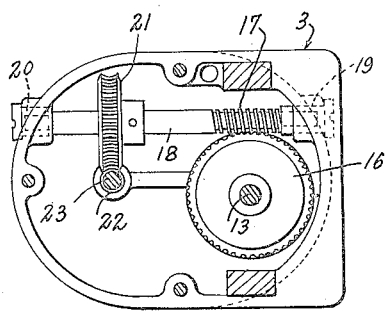
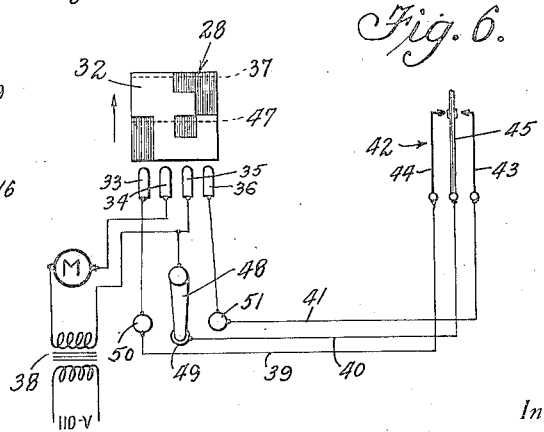
Inventors
Charles H. Fennell
John M. Main
By Lyon & Lyon
Attorneys Patented May 5, 1936

UNITED STATES PATENT OFFICE 2,039,526

AUTOMATIC CONTROL APPARATUS

Charles H. Fennell, San Marino, and John M. Main, Los Angeles, Calif.

Application June 4, 1934, Serial No. 728,838

2 Claims. (Cl. 172—36)

This invention relates broadly to automatic control apparatus and more specifically to motor actuated valves. It has particular application to thermostatic controlled heating systems for controlling the flow of steam, hot water, gas or liquid fuel.

A broad object of the invention is to provide a motor actuated control valve which is compact and simple in construction and is reliable and positive in operation. A more specific object is to provide a motor actuated control valve without intricate mechanical linkage between the motor and valve for opening and closing the latter.

The above objects are attained in accordance with the invention by employing a rotary valve adapted to be rotated continuously in the same direction, geared directly to an electric motor, with a switching mechanism for starting and stopping the motor to shift the valve from open to closed position and from closed to open position.

Other objects and specific features of the invention will be apparent from the following detailed description which refers to the drawing.

In the drawing:

Fig. 1 is an elevation view showing a portion of a steam or hot water radiator equipped with an automatic control valve in accordance with the invention;

Fig. 2 is a vertical section through the control valve disclosed in Fig. 1;

Fig. 3 is a vertical section of a portion of the control mechanism, the view being taken in the plane III—III of Fig. 2;

Fig. 4 is a horizontal section taken in the plane IV—IV of Fig. 2;

Fig. 5 is a detail cross section taken in the plane V—V of Fig. 2; and

Fig. 6 is a schematic diagram of a control circuit in which our valve may be employed.

As shown in Fig. 1, an automatic control valve in accordance with the invention comprises a valve casing 1 of conventional appearance adapted to be connected in the steam or water inlet line of a radiator 2. The valve 1 has attached thereto a casing 3 containing a motor, gear and control mechanism for actuating a valve within the valve casing 1.

Referring to Figs. 2 and 5, the valve casing 1 is provided with a cylindrical bore 4 having a port 5 in one side thereof, which port is adapted to be connected as by the threaded flange 6 to a radiator or to a conduit leading to a radiator or other device to be supplied with fluid from the valve. The valve mechanism itself comprises an arcuate sleeve 7 ground to seal with the bore 4 and rotatably supported upon a hub 8 centrally positioned with respect to the bore 4. The sleeve 7 is provided with radial holes therein, into which there slidably fit the ends of radial pins 9 secured to and extending from the hub 8. These pins force the sleeve 7 to rotate with the hub 8 but permit the sleeve to move radially with respect to the hub. The sleeve 7 is normally maintained in contact with the cylindrical surface of the bore 4 by a coil spring 10. Fluid is admitted to the bore 4 through the lower end of the casing 1, through a bushing 11. It will be observed that the fluid pressure within the casing will normally tend to force the sleeve in sealing engagement with that portion of the bore 4 surrounding the port 6 when the sleeve is in the position shown in the drawing, thereby preventing any flow of fluid through the port 5. Of course, if the hub 8 is rotated to carry the sleeve 7 clear of the port 5, fluid can flow therethrough freely.

The gear case 3 is secured to the upper end of the valve casing 1, the connection being made by screw threads, as shown in Fig. 2. To rotate the hub 8, a shaft 13 is rotatably mounted in the gear case in alignment with the hub and secured thereto at the lower end. Thus the shaft 13 is radially supported at the lower end in a central aperture in the gear case 3 and is radially supported at the upper end by a bearing member 14, which is shown to best advantage in Fig. 3, and constitutes an L-shaped member secured to and projecting inwardly from one side of the gear case. To prevent any leakage of fluid from the valve casing 1 upon into the gear case 3, packing 12 is provided about the shaft 13 and a packing nut 15 is provided for compressing the packing about the shaft.

Shaft 13 is adapted to be rotated through a worm wheel 16 secured thereto, which worm wheel meshes with a worm 17 (Fig. 4) on a shaft 18, which extends horizontally through the gear case and is journaled at opposite ends in bearings 19 and 20 supported in the walls of the gear case. The shaft 18 in turn is adapted to be rotated by a worm wheel 21 secured thereto, which worm wheel meshes with a worm 22 on a motor shaft 23. The motor shaft 23 is rotatably mounted in bearings 24 and 25 at its upper and lower ends, respectively, the bearings being supported in the gear case. The motor shown is of the induction type, comprising a stationary stator or field winding structure 26 supported in the gear casing and a rotor 27 keyed to the motor shaft 23. By virtue of the great force amplification obtained through the double worm gear reduction between the motor shaft 23 and the valve actuating shaft 13, a relatively small and compact motor develops ample power to actuate the valve.

It is essential in a valve of the type so far described that some means be provided for automatically stopping the motor, after it has been set in operation, at the proper time to leave the valve in full open or closed position. To this end, we provide a commutator 28 mounted on a horizontal shaft 29 rotatably supported in opposite walls of the gear case above the shaft 13 and connected in driven relation with the shaft 13 through beveled gears 29a and 30. In the particular model shown the gears 29a and 30 are of the same size so that the shafts 13 and 29 rotate at the same speed. The commutator 28 comprises a core of insulating material 31, upon which there is secured a copper sleeve 32 upon which bear four brushes 33, 34, 35, and 36.

Referring now to Fig. 6, it will be observed that the surface of the commutator 28 has been shown developed. It will be observed that the copper sleeve 32 is cut in a particular fashion to make contact with and/or break contact with the various brushes 33 to 36, inclusive, at various points about the circumference of the commutator. Assume that the commutator rotates in the direction indicated by the arrow in Fig. 6 and that when the valve sleeve 7 is juxtaposed to and is sealing the port 5 the brushes 33, 34, 35, and 36 contact the commutator along the line 37. Under these conditions a circuit for energizing the motor (M in Fig. 6) may be traced from one side of an energizing transformer 38 through the motor M to brush 34. The other end of the transformer winding 38, it will be observed, is connected directly to brush 35 which, in the position assumed, does not contact the commutator sleeve 32 and therefore cannot complete a circuit to brush 34. However, in the circuit of Fig. 6 the brush 33, brush 35 and brush 36 are connected through leads 39, 40, and 41, respectively, to the three contacts of a thermostatic control switch 42. Thus the lead 41 is connected to a stationary contact 43 of the thermostatic switch, the lead 39 is connected to the opposite stationary contact 44 of the thermostatic switch, and the lead 40 is connected to the temperature controlled movable contact 45 of the thermostatic switch. The movable contact 45 makes with the stationary contact 44 in response to temperatures below a predetermined value and makes with stationary contact 43 in response to temperatures above a predetermined value. Assuming that the circuit shown in Fig. 6 is employed with a control valve on a radiator, as shown in Fig. 1, then when the valve is in closed position the brushes 33 to 36 will rest on the commutator 28 along the line 37, and the energizing circuit for the motor will be open at brush 35 and at contact 44 on the thermostatic switch so long as the temperature remains above the predetermined value for which the thermostat is set. It will be observed that under these conditions closure of the contact 45 on the contact 43 produces no effect because contact 43 is connected to brush 36 which, like brush 35, is out of contact with the commutator segment 32. However, when the temperature drops sufficiently to close contact 45 on contact 44, a circuit is completed from the right end of the transformer winding 38, through the thermostat contacts 45 and 44 to the brush 33, thence through the commutator segment 32 to brush 34 and through the motor and back to the left end of the transformer winding 38. The motor thereupon starts to run and shifts the commutator and the valve until the brushes 33 to 36 are contacting the commutator along the line 47, which is diametrically opposite the line 37. At this point the motor is stopped by virtue of the fact that the segment 32 clears and breaks contact with the brush 33 and also brush 35. (It will be observed that brush 35 makes contact with the segment 32 during the second quarter revolution of the commutator. This is to insure complete movement of the valve from closed to fully open position after it has once been started in operation.)

As a result of the operations described, closure of the thermostatic closure 45 on the contact 44 as a result of a reduction in the temperature of a room has actuated the motor M to rotate the valve shaft 13 and the commutator 28 through a half revolution to open the valve. This movement of the commutator, in addition to opening the connection between the segment 32 and the brushes 33 and 35, completes a connection between the segment 32 and brush 36, thereby preparing a circuit for the operation of the motor M in response to closure of the thermostat contact 42 on the contact 43, which will occur when, as a result of the heat radiated from the radiator 2, the room attains a temperature above that for which the thermostat is set. Thus with the brushes 33 to 36 resting on the commutator along the line 47 and the thermostatic contact 42 closed on contact 43, a circuit for energizing the motor M is completed from the left end of the transformer winding 38, through the motor, thence through brush 34 to the commutator segment 32, thence through brush 36 and lead 41 to contact 43, thence through contact 45 and lead 40 to the opposite end of the transformer winding 38. The motor is thereupon energized and continues to run until the valve shaft and commutator have been carried through another half revolution, thereby again shifting the valve into closed position and carrying the brush 36 off the commutator segment 32 and breaking the energizing circuit for the motor.

In the circuit shown in Fig. 6, the connection from brush 35 to lead 40 is completed through a movable switch arm 48 and stationary contact 49. Likewise the brush 33 is connected to a switch contact 50 adapted to be contacted by the switch arm 48, and the brush 36 is connected to a switch contact 51, also adapted to be contacted by the switch arm 48. This additional switch is provided to make it possible to take the valve out of the control of the thermostatic switch 42. Thus by throwing the switch arm 48 into contact with the contact 50, a circuit is completed directly from the right end of the transformer winding 38, through the switch arm 48 and contact 50 to brush 33, thereby causing the motor to run until the commutator segment 32 breaks with the brush 33, thereby maintaining the valve permanently in open position. On the other hand, if the switch arm 48 is thrown into contact with contact 51, the right end of the transformer winding 38 is permanently connected to the brush 36, which will complete a circuit directly through the commutator segment 32 to shift the valve into closed position and maintain it in that position by virtue of the fact that the brush 36 is then out of contact with the commutator segment 32.

The switch arm 48 and contacts 49, 50 and 51 are preferably mounted within the gear casing.

Thus, as shown in Fig. 2, the contacts 49, 50 and 51 are mounted in a plate of insulating material 53 and the arm 48 is mounted on a hub 54 journaled in the insulating plate 53. The hub 54 is attached by a shaft 55 to a knob 56 positioned exterior of the gear case. It will be observed from Fig. 2 that the brushes 33, 34, 35 and 36 are also mounted upon the insulating plate 53 and extend rearwardly therefrom and bear against the top of the commutator 28. To facilitate inspection of the commutator and switch assembly, the gear case is provided with a removable wall portion 57.

Although our valve has been particularly disclosed and described so far in connection with a radiator adapted to be supplied with steam or hot water through the valve, it is to be understood that the valve assembly is useful in many other applications. Thus it would be particularly useful in connection with the automatic control of a gas furnace, the automatic valve being placed in the gas supply line to the furnace. In a furnace control it is usually desirable to shift the drafts on the furnace at the same time the fuel supply is turned on or off. To this end, the commutator shaft 29 (Fig. 3) may be extended beyond the gear case and arms 58 provided thereon, as shown in dotted lines in Fig. 3. These arms may be coupled by any suitable mechanism to the drafts of a furnace to close and open them simultaneously with closure or opening of the fuel supply valve. The methods of actuating furnace draft doors or dampers from movable arms of the type shown at 58 in Fig. 2 are well known and need no illustration.

We claim:

1. A motor actuated control device comprising a casing, a first shaft in said casing, bearing means for supporting said shaft for rotation, a second shaft mounted for rotation within said gear case at right angles to said first shaft, cooperating gears on said first and second shafts coupling them for synchronous rotation, an electric motor in said gear case having its shaft parallel to but offset from said first shaft, a worm on said motor shaft, a third shaft extending transversely with respect to said first shaft and motor shaft and having a worm wheel meshing with said worm on said motor shaft, a worm wheel on said first shaft, and a worm on said third shaft meshing therewith, a commutator means on said second shaft for completing one circuit to energize said motor while said second shaft is rotating through half a revolution and for completing a second circuit to energize said motor while said second shaft is rotating through the remainder of its revolution, and means connected to said second shaft for movement therewith for actuating a mechanism to be controlled by said device.

2. A motor actuated control device comprising a gear casing, a shaft positioned within said gear casing and extending therefrom for rotating an element to be controlled, bearing means for supporting said shaft for rotation, a second shaft mounted for rotation within said gear case at right angles to said first shaft, cooperating gears on said first and second shafts coupling them for synchronous rotation, an electric motor in said gear case having its shaft parallel to but offset from said first shaft, a worm on said motor shaft, a third shaft extending transversely with respect to said first shaft and motor shaft and having a worm wheel meshing with said worm on said motor shaft, a worm wheel on said first shaft and a worm on said third shaft meshing therewith, a commutator means on said second shaft for completing one circuit to energize said motor while said first mentioned shaft is positioned within a first predetermined angle of rotary movement and for completing a second circuit to energize said motor while said first mentioned shaft is positioned within a second predetermined angle of rotary movement.

CHARLES H. FENNELL.
JOHN M. MAIN.